United States Patent
Chai et al.

(10) Patent No.: US 12,299,436 B2
(45) Date of Patent: May 13, 2025

(54) METHOD AND APPARATUS OF GENERATING REGULAR EXPRESSION FOR PARAMETER OF APPLICATION SYSTEM AND METHOD AND APPARATUS OF CHECKING VALIDITY OF PARAMETER OF APPLICATION SYSTEM

(71) Applicant: Alipay (Hangzhou) Information Technology Co., Ltd., Zhejiang (CN)

(72) Inventors: Bingxu Chai, Zhejiang (CN); Wei Jiang, Zhejiang (CN); Jianguo Li, Zhejiang (CN); Haoxuan Yu, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 176 days.

(21) Appl. No.: 18/318,632

(22) Filed: May 16, 2023

(65) Prior Publication Data
US 2023/0376303 A1    Nov. 23, 2023

(30) Foreign Application Priority Data
May 17, 2022    (CN) .......................... 202210539375.X

(51) Int. Cl.
*G06F 8/70* (2018.01)
*G06F 11/36* (2006.01)
*G06F 11/3604* (2025.01)

(52) U.S. Cl.
CPC ............ *G06F 8/70* (2013.01); *G06F 11/3604* (2013.01)

(58) Field of Classification Search
None
See application file for complete search history.

(56) References Cited

U.S. PATENT DOCUMENTS

| | | | |
|---|---|---|---|
| 2019/0065576 A1* | 2/2019 | Peng | G06F 16/285 |
| 2019/0289160 A1* | 9/2019 | Hayashi | G06F 9/451 |
| 2021/0342654 A1* | 11/2021 | Garg | G06N 5/04 |

OTHER PUBLICATIONS

Alberto Bartoli, "Inference of Regular Expressions for Text Extraction from Examples", IEEE, vol. 25, No. 5 (Year: 2016).*

* cited by examiner

*Primary Examiner* — Lewis A Bullock, Jr.
*Assistant Examiner* — Mark A Gooray
(74) *Attorney, Agent, or Firm* — Seed IP Law Group LLP

(57) ABSTRACT

Implementations of the present specification provide a method of generating a regular expression for a parameter of an application system and a method and an apparatus of checking validity of a parameter of an application system. To generate a regular expression for a parameter of the application system, parameter values of each parameter in each method code block are obtained from a historical implementation of the application system. Common information is extracted from the corresponding parameter values for each parameter in each method code block. Then a corresponding regular expression is generated for each parameter in each method code block based on the extracted common information.

20 Claims, 9 Drawing Sheets

FIG. 1

```
public void methodDemo(String a, String b) {
    system.out.println("Demo");
}
```

- ['today123','today234','today1234',{"a":"100","b":"200"}]

- ['yestoday123','yestoday234','yestoday1234',{"a":"100","b":"200"}]

FIG. 4B

- 'today123','today234','today1234'

- 'today123','today234','today1234'

FIG. 4C

| Value |
|-------|
| N |
| N |
| Y |
| N |

FIG. 4D public@123 public@345 public@234

FIG. 4E public@123/asdasd public@243,asdas public@1233@123 public@12312,asda,asda

For each parameter in each method, respectively perform parameter format parsing on parameter values of the parameter to determine a parameter type of the parameter 510

Extract common information from the parameter values of each parameter by using a corresponding information extraction approach 520

FIG. 5

{'dict_len':{ },'key_pattern':[{}],'key_value':[[]]}

{'json_large':{'dict_len':{ },'key_pattern':[{}],'key_value':[[]],'element':[{'pattern':' ','value':[[]]}]}

{'value':[]}

{'pattern':'d','value':[[]],'count':{ }}

{[{'pattern':' ','value':[[]]}

{'common_start':'public'}

METHOD AND APPARATUS OF GENERATING REGULAR EXPRESSION FOR PARAMETER OF APPLICATION SYSTEM AND METHOD AND APPARATUS OF CHECKING VALIDITY OF PARAMETER OF APPLICATION SYSTEM

TECHNICAL FIELD

Implementations of the present specification generally relate to the field of computer technologies, and in particular, to generating a regular expression.

BACKGROUND

An application system can be implemented by using application code, and code blocks having independent functions in the implemented application code can be organized as methods to implement specified functions. Each method for implementing a specified function can include a variety of parameters. A value can be assigned to each parameter, in other words, parameter configuration can be performed during a code implementation (code writing). In addition, when the application system has been implemented as the application code, parameter configuration data in the implemented application code can be adjusted to optimize or adjust application scenarios of the application system. When the application system runs, if a certain function needs to be executed, a corresponding method in an application can be invoked to implement the function.

The parameter configuration in the method needs to comply with specifications. Once configured parameters do not comply with the specifications, an operation failure occurs and an error is reported when the application system invokes the method. For determining whether the parameter configuration complies with the specifications, a currently used method is to invoke a corresponding method by running the application system and perform the determination depending on whether an error is reported by the application system. Time costs and calculation costs are increased if it can be identified that a method parameter does not comply with the specifications only after the application system reports an error. As the application system becomes larger, the number of methods in the application system also increases, adversely affecting the performance of the application system to a great extent.

To solve the above problems, a method of checking validity of a parameter based on a regular expression is provided. The regular expression used is directly generated based on original data of historical parameter configuration data of parameters, and a regular expression is generated based on each piece of parameter configuration data. However, when the application system is applied to a service scenario, a very large number of parameters are used, and corresponding parameter content is diversified. In this case, if a regular expression is generated based on each piece of parameter configuration data of each parameter, a very large number of regular expressions are generated, which is unfavorable for later check. Moreover, because the original data of the parameter configuration data is relatively long, the generated regular expression is relatively long, increasing the matching complexity in performing parameter validity check.

SUMMARY

Implementations of the present specification provide a regular expression generation solution for a parameter of an application system and a parameter validity check solution performed based on a regular expression generated based on the regular expression generation solution. According to the regular expression generation solution, for each parameter in each method of the application system, common information can be extracted from historical configuration data of the parameter, and a regular expression of the parameter can be generated based on the common information, instead of generating one regular expression based on each piece of parameter configuration data of each parameter, so that the number of regular expressions corresponding to each parameter can be reduced while shortening the length of the generated regular expression, thereby reducing the matching complexity in performing parameter validity check.

According to an aspect of implementations of the present specification, a method of generating a regular expression for a parameter of an application system is provided. The method includes: obtaining parameter values of each parameter in each method code block from a historical implementation of the application system; extracting common information from the corresponding parameter values for each parameter in each method code block; and generating a corresponding regular expression for each parameter in each method code block based on the extracted common information.

In some implementations, in an example of the above aspect, the extracting the common information from the corresponding parameter values for each parameter in each method code block can include: performing, for each parameter in each method code block, parameter format parsing on the parameter values of the parameter to determine a parameter type of the parameter, where each parameter type corresponds to an information extraction approach; and extracting, for each parameter type of each parameter, common information corresponding to the parameter type from parameter values of the parameter having the parameter type by using an information extraction approach corresponding to the parameter type.

In some implementations, in an example of the above aspect, each parameter type has a corresponding template style, and the template style includes a template information composition and a recording format of each piece of template information. The extracting, for each parameter type of each parameter, the common information corresponding to the parameter type from the parameter values of the parameter having the parameter type by using the information extraction approach corresponding to the parameter type can include: performing, for each parameter type of each parameter, template extraction on parameter values of the parameter having the parameter type based on a corresponding template style, where extracted template information in the template style is used as common information corresponding to the parameter type. The generating the corresponding regular expression for each parameter in each method code block based on the extracted common information can include: generating a corresponding regular expression for each template corresponding to each parameter in each method code block based on template information of the template.

In some implementations, in an example of the above aspect, each parameter type has a corresponding regular expression generation approach. The generating the corresponding regular expression for each template corresponding to each parameter in each method code block based on the template information of the template can include: generating the corresponding regular expression for each template corresponding to each parameter in each method code block based on the template information of the template and a regular expression generation approach corresponding to a parameter type of the parameter.

In some implementations, in an example of the above aspect, the parameter type includes a first type of which all parameter content of a parameter value is capable of undergoing format parsing, a second type of which all parameter content of a parameter value is incapable of undergoing format parsing, and a third type of which a part of parameter content of a parameter value is capable of undergoing format parsing and a part of the parameter content is incapable of undergoing format parsing. The extracting, for each parameter type of each parameter, the common information corresponding to the parameter type from the parameter values of the parameter having the parameter type by using the information extraction approach corresponding to the parameter type can include: in response to that the parameter type is the first type, extracting common information from parameter values of the parameter having the first type based on an information extraction approach corresponding to the first type; in response to that the parameter type is the second type, extracting common information from parameter values of the parameter having the second type based on an information extraction approach corresponding to the second type; and in response to that the parameter type is the third type, dividing parameter values of the parameter having the third type into a first parameter part whose parameter type is the first type and a second parameter part whose parameter type is the second type, extracting common information from the first parameter part based on the information extraction approach corresponding to the first type, and extracting common information from the second parameter part based on the information extraction approach corresponding to the second type.

In some implementations, in an example of the above aspect, the parameter type includes a first type of which all parameter content of a parameter value is capable of undergoing format parsing, a second type of which all parameter content of a parameter value is incapable of undergoing format parsing, and a third type of which a part of parameter content of a parameter value is capable of undergoing format parsing and a part of the parameter content is incapable of undergoing format parsing. The generating the corresponding regular expression for each template corresponding to each parameter in each method code block based on the template information of the template and the regular expression generation approach corresponding to the parameter type of the parameter can include: generating a regular expression for a template corresponding to a parameter whose parameter type is the first type based on template information of the template and a regular expression generation approach corresponding to the first type; generating a regular expression for a template corresponding to a parameter whose parameter type is the second type based on template information of the template and a regular expression generation approach corresponding to the second type; and for a template corresponding to a parameter whose parameter type is the third type, generating a first regular expression based on the regular expression generation approach corresponding to the first type and template information extracted from template information of the template based on an information extraction approach corresponding to the first type, generating a second regular expression based on the regular expression generation approach corresponding to the second type and template information extracted from template information of the template based on an information extraction approach corresponding to the second type, and combining the obtained first regular expression and second regular expression to obtain a regular expression corresponding to the template.

In some implementations, in an example of the above aspect, the format parsing includes JSON format parsing. The generating the regular expression for the template corresponding to the parameter whose parameter type is the second type based on the template information of the template and the regular expression generation approach corresponding to the second type can include: for the template corresponding to the parameter whose parameter type is the second type, obtaining a character-type value and a number-type value from the template information of the template by using a double-pointer access method; and generating the regular expression based on the obtained character-type value and number-type value and the regular expression generation approach corresponding to the second type.

In some implementations, in an example of the above aspect, the method can further include: storing the generated regular expression in a regular expression database in association with both a method code block and a parameter.

According to another aspect of implementations of the present specification, a method of checking validity of a parameter of an application system is provided. The method includes: intercepting a parameter value of a parameter to be checked of the application system, where the parameter to be checked is a parameter in a target method code block of the application system; obtaining a regular expression corresponding to the parameter to be checked from a regular expression database, where the regular expression is generated based on the method described above; and performing parameter validity check based on the intercepted parameter value and the obtained regular expression, where it is determined that the parameter to be checked is a valid parameter in response to that the intercepted parameter value matches the obtained regular expression, and it is determined that the parameter to be checked is an invalid parameter in response to that the intercepted parameter value does not match the obtained regular expression.

According to an aspect of implementations of the present specification, an apparatus of generating a regular expression for a parameter of an application system is provided. The apparatus includes: a parameter value acquisition unit, configured to obtain parameter values of each parameter in each method code block from a historical implementation of the application system; a common information extraction unit, configured to extract common information from the corresponding parameter values for each parameter in each method code block; and a regular expression generation unit, configured to generate a corresponding regular expression for each parameter in each method code block based on the extracted common information.

In some implementations, in an example of the above aspect, the common information extraction unit can include: a parameter type determining module, configured to perform, for each parameter in each method code block, parameter format parsing on the parameter values of the parameter to determine a parameter type of the parameter, where each parameter type corresponds to an information extraction approach; and a common information extraction module, configured to extract, for each parameter type of each parameter, common information corresponding to the parameter type from parameter values of the parameter having the parameter type by using an information extraction approach corresponding to the parameter type.

In some implementations, in an example of the above aspect, each parameter type has a corresponding template style, and the template style includes a template information composition and a recording format of each piece of template information. The common information extraction module performs, for each parameter type of each parameter, template extraction on parameter values of the parameter having the parameter type based on a corresponding template style. Extracted template information in the template style is used as common information corresponding to the parameter type. The regular expression generation unit generates a corresponding regular expression for each template corresponding to each parameter in each method code block based on template information of the template.

In some implementations, in an example of the above aspect, each parameter type has a corresponding regular expression generation approach. The regular expression generation unit generates the corresponding regular expression for each template corresponding to each parameter in each method code block based on the template information of the template and a regular expression generation approach corresponding to a parameter type of the parameter.

In some implementations, in an example of the above aspect, the parameter type includes a first type of which all parameter content of a parameter value is capable of undergoing format parsing, a second type of which all parameter content of a parameter value is incapable of undergoing format parsing, and a third type of which a part of parameter content of a parameter value is capable of undergoing format parsing and a part of the parameter content is incapable of undergoing format parsing. In response to that the determined parameter type is the first type, the common information extraction unit extracts common information from parameter values of the parameter having the first type based on an information extraction approach corresponding to the first type. In response to that the determined parameter type is the second type, the common information extraction unit extracts common information from parameter values of the parameter having the second type based on an information extraction approach corresponding to the second type. In response to that the determined parameter type is the third type, the common information extraction unit divides parameter values of the parameter having the third type into a first parameter part whose parameter type is the first type and a second parameter part whose parameter type is the second type, extracts common information from the first parameter part based on the information extraction approach corresponding to the first type, and extracts common information from the second parameter part based on the information extraction approach corresponding to the second type.

In some implementations, in an example of the above aspect, the parameter type includes a first type of which all parameter content of a parameter value is capable of undergoing format parsing, a second type of which all parameter content of a parameter value is incapable of undergoing format parsing, and a third type of which a part of parameter content of a parameter value is capable of undergoing format parsing and a part of the parameter content is incapable of undergoing format parsing. The regular expression generation unit generates a regular expression for a template corresponding to a parameter whose parameter type is the first type based on template information of the template and a regular expression generation approach corresponding to the first type. The regular expression generation unit generates a regular expression for a template corresponding to a parameter whose parameter type is the second type based on template information of the template and a regular expression generation approach corresponding to the second type. For a template corresponding to a parameter whose parameter type is the third type, the regular expression generation unit generates a first regular expression based on the regular expression generation approach corresponding to the first type and template information extracted from template information of the template based on an information extraction approach corresponding to the first type, generates a second regular expression based on the regular expression generation approach corresponding to the second type and template information extracted from template information of the template based on an information extraction approach corresponding to the second type, and combines the obtained first regular expression and second regular expression to obtain a regular expression corresponding to the template.

In some implementations, in an example of the above aspect, the format parsing includes JSON format parsing. For the template corresponding to the parameter whose parameter type is the second type, the regular expression generation unit obtains a character-type value and a number-type value from the template information of the template by using a double-pointer access method, and generates the regular expression based on the obtained character-type value and number-type value and the regular expression generation approach corresponding to the second type.

In some implementations, in an example of the above aspect, the apparatus can further include a storage unit, configured to store the generated regular expression in a regular expression database in association with both a method code block and a parameter.

According to an aspect of implementations of the present specification, an apparatus of checking validity of a parameter of an application system is provided. The apparatus includes: a parameter value interception unit, configured to intercept a parameter value of a parameter to be checked of the application system, where the parameter to be checked is a parameter in a target method code block of the application system; a regular expression acquisition unit, configured to obtain a regular expression corresponding to the parameter to be checked from a regular expression database, where the regular expression is generated based on the method described above; and a validity check unit, configured to perform parameter validity check based on the intercepted parameter value and the obtained regular expression, where the validity check unit determines that the parameter is a valid parameter in response to that the intercepted parameter value matches the obtained regular expression, and the validity check unit determines that the parameter to be checked is an invalid parameter in response to that the intercepted parameter value does not match the obtained regular expression.

According to an aspect of implementations of the present specification, a system of checking validity of a parameter of an application system is provided. The system includes: the apparatus of generating a regular expression for a parameter of an application system described above; a regular expression database, configured to store a generated regular expression in association with both a method code block and a parameter; and the apparatus of checking validity of a parameter of an application system described above.

According to an aspect of implementations of the present specification, an apparatus of generating a regular expression for a parameter of an application system is provided. The apparatus includes at least one processor, a memory coupled to the at least one processor, and a computer program stored in the memory. The at least one processor executes the computer program to implement the method of generating a regular expression for a parameter of an application system described above.

According to an aspect of implementations of the present specification, an apparatus of checking validity of a parameter of an application system is provided. The apparatus includes at least one processor, a memory coupled to the at least one processor, and a computer program stored in the memory. The at least one processor executes the computer program to implement the method of checking validity of a parameter of an application system described above.

According to an aspect of implementations of the present specification, a computer-readable storage medium is provided. The computer-readable storage medium stores executable instructions, and when the instructions are executed, a processor is enabled to perform the method of generating a regular expression for a parameter of an application system described above or the method of checking validity of a parameter of an application system described above.

According to an aspect of implementations of the present specification, a computer program product is provided. The computer program product includes a computer program, and when the computer program is executed by a processor, the method of generating a regular expression for a parameter of an application system described above or the method of checking validity of a parameter of an application system described above is implemented.

BRIEF DESCRIPTION OF DRAWINGS

The essence and advantages of the present specification can be further understood with reference to the following accompanying drawings. In the accompanying drawings, similar components or features can have the same reference numeral.

FIG. 3 is an example schematic diagram illustrating a method in an application code implementation of an application system;

FIG. 4A to FIG. 4F are example schematic diagrams illustrating parameter values according to an implementation of the present specification;

FIG. 5 is an example flowchart illustrating a common information extraction process according to an implementation of the present specification;

DESCRIPTION OF IMPLEMENTATIONS

Figure 1:
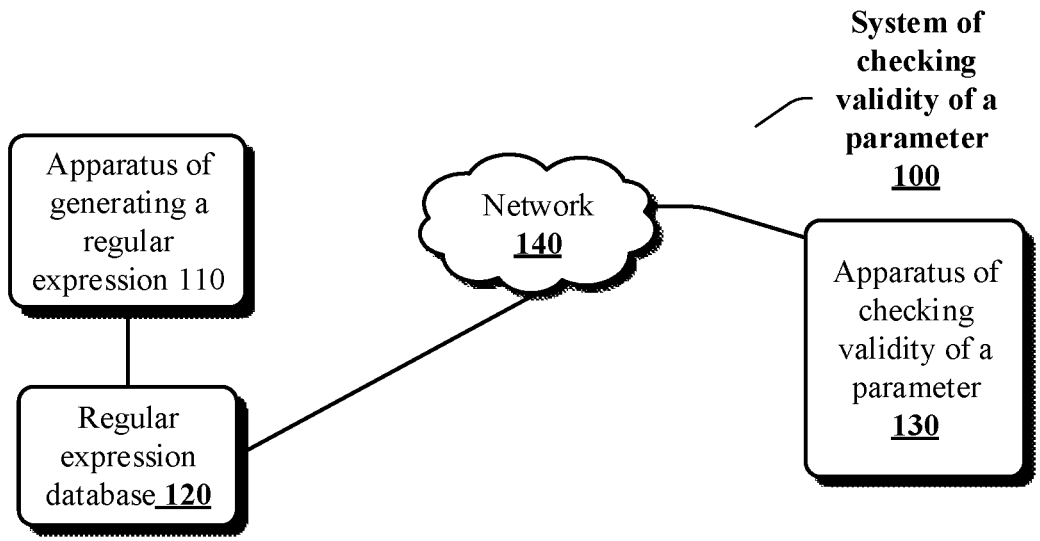
FIG. 1 is an example block diagram illustrating a system of checking validity of a parameter according to an implementation of the present specification.

The subject matters described herein will now be discussed with reference to example implementations. It should be understood that the discussion of these implementations is merely to enable a person skilled in the art to better understand and thereby achieve the subject matter described herein, and is not intended to limit the protection scope, applicability, or examples set forth in the claims. The function and arrangement of discussed elements can be changed without departing from the protection scope of the content of the present specification. In the examples, various processes or components can be omitted, replaced, or added as needed. For example, the described method can be performed in a different order than the described order, and various steps can be added, omitted, or combined. In addition, features described with respect to some examples can be combined in other examples.

As used herein, the term "include" and a variation thereof are open-ended terms, and mean "including but not limited to". The term "based on" represents "partially based on". The terms "one implementation" and "an implementation" represent "at least one implementation". The term "another implementation" represent "at least one other implementation". The terms "first", "second", and the like can represent different or same objects. Other explicit or implicit definitions can be included below. Unless the context clearly indicates otherwise, the definition of a term is consistent throughout the specification.

In some methods of generating a regular expression, a regular expression is directly generated based on original data of historical parameter configuration data of parameters, and a regular expression is generated based on each piece of parameter configuration data. When an application system is applied to a service scenario, a large number of parameters are used, and corresponding parameter content is diversified. In this case, if a regular expression is generated based on each piece of parameter configuration data of each parameter, a very large number of regular expressions are generated, which is unfavorable for later check. Moreover, because the original data of the parameter configuration data is relatively long, the generated regular expression is relatively long, increasing the matching complexity in performing parameter validity check.

Implementations of the present specification provide a regular expression generation solution for a parameter of an application system. According to the regular expression generation solution, for each parameter in each method of the application system, common information can be extracted from historical configuration data of the parameter, and a regular expression of the parameter can be generated based on the common information, instead of generating one regular expression based on each piece of parameter configuration data of each parameter, so that the number of regular expressions corresponding to each parameter can be reduced while shortening the length of the generated regular expression, thereby reducing the matching complexity in performing parameter validity check.

A system of checking validity of a parameter, a method of generating a regular expression, and a method and an apparatus of checking validity of a parameter according to implementations of the present specification are described below in detail with reference to the accompanying drawings.

FIG. 1 is an example schematic diagram illustrating a system 100 of checking validity of a parameter according to an implementation of the present specification. As shown in FIG. 1, the system 100 of checking validity of a parameter includes an apparatus 110 of generating a regular expression, a regular expression database 120, an apparatus 130 of checking validity of a parameter, and a network 140.

The apparatus 110 of generating a regular expression is configured to generate a regular expression set of an application system based on parameter values of each parameter in each method of a historical implementation of the application system. In the generated regular expression set, one or more regular expressions can be generated for each parameter in each method. The generated regular expression set is stored in the regular expression database 120 in association with the application system. For example, a unique parameter id is assigned to each parameter in each method of the application system, and the assigned parameter id can be, for example, application system id.interface id.method id.parameter id. A regular expression corresponding to the parameter is stored in the regular expression database 120 in association with the parameter id of the parameter.

In some implementations, the apparatus 110 of generating a regular expression can be implemented by any type of electronic computing device. For example, the apparatus 110 of generating a regular expression can be a desktop computer, a notebook computer, a tablet computer, or a smartphone.

In some implementations, the regular expression database 120 can be deployed at a different physical device from the apparatus 110 of generating a regular expression. In some implementations, the regular expression database 120 can be integrated in the apparatus 110 of generating a regular expression.

The regular expression database 120 and the apparatus 130 of checking validity of a parameter can be communicatively connected to each other through the network 140. The network 140 can be any type of network capable of interconnecting network entities. The network 140 can be a single network or a combination of various networks. In terms of coverage, the network 140 can be a local area network (LAN), a wide area network (WAN), or the like. In terms of bearer media, the network 140 can be a wired network, a wireless network, or the like. In terms of data switching technologies, the network 140 can be a circuit switched network, a packet switched network, or the like. It should be understood that all network entities shown in FIG. 1 are examples, and any other network entity can be involved in the system 100 of checking validity of a parameter based on a specific application requirement.

The apparatus 130 of checking validity of a parameter is configured to perform parameter validity check based on the corresponding regular expression obtained from the regular expression database 120 and the obtained parameter values in response to triggering a parameter validity check process.

Figure 2:
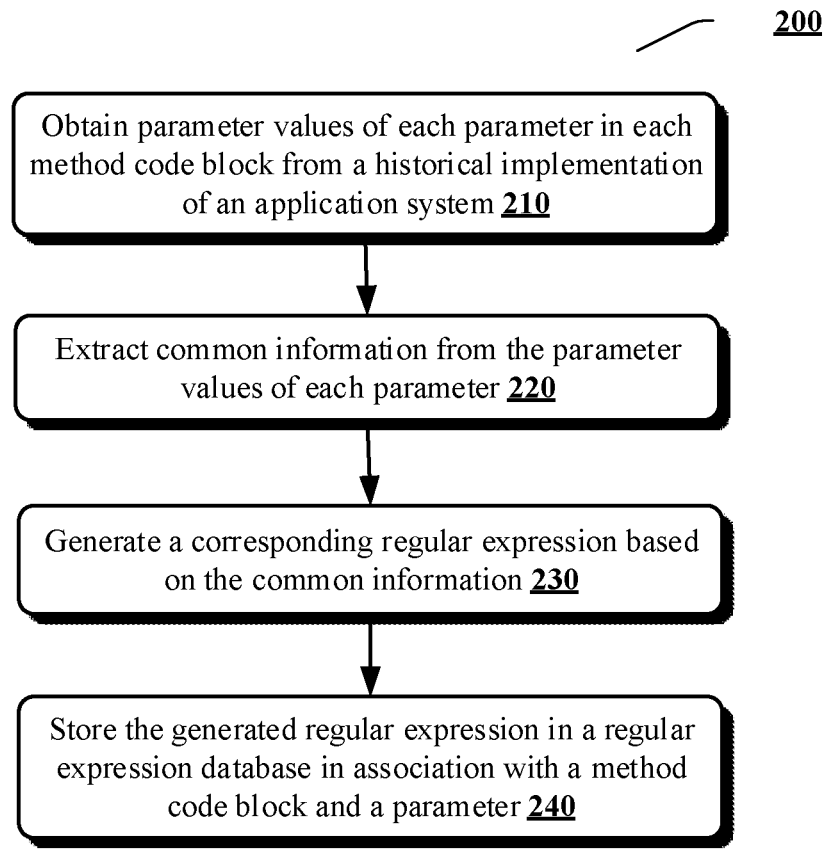
FIG. 2 is an example flowchart illustrating a regular expression generation process according to an implementation of the present specification.

FIG. 2 is an example flowchart illustrating a regular expression generation process 200 according to an implementation of the present specification.

As shown in FIG. 2, in 210, parameter values of each parameter in each method code block are obtained from a historical implementation of an application system. In the present specification, the historical implementation of the application system can be application code implementations of the application system in various application scenarios or service scenarios. In the application implementation of the application system, application code is organized as different methods, and each method is used to implement a specified function or sub-function of the application system. When an application is running, each method can be invoked by a corresponding interface to implement a corresponding function or sub-function. Each method can have one or more parameters. In different historical implementations, different parameter values can be assigned to the one or more parameters to adapt to different application scenarios or service scenarios.

FIG. 3 is an example schematic diagram illustrating a method in an application code implementation of an application system. In the example of FIG. 3, a name of the method is methodDemo, the method has parameters a and b, and the parameters a and b are strings. A function performed by methodDemo is "System.out.println("Demo")", that is, printing "Demo". A unique parameter id can be assigned to each parameter in the method. In some implementations, the parameter id can be uniquely represented by an application system name, a method name, and a parameter name. For example, a parameter id: application system name.methodDemo.a can be assigned to parameter a. In some implementations, the parameter id can be uniquely represented by an application system name, an interface name, a method name, and a parameter name when the method is invoked by a particular interface. For example, a parameter id: application system name.interface name.methodDemo.a can be assigned to parameter a.

Parameter values with a variety of parameter formats can be assigned to each parameter of each method, and the parameter values are input from corresponding interfaces when being invoked. The parameter format of the parameter value can also be referred to as a representation form of the parameter value. FIG. 4A to FIG. 4F are example schematic diagrams illustrating parameter values according to an implementation of the present specification. In FIG. 4A to FIG. 4F, each row represents one parameter value of the parameter.

Each parameter value shown in FIG. 4A includes two key value pairs, for example, "a":"100" and "b":"200". Each parameter value shown in FIG. 4B includes four list elements. The first three elements are strings, and the fourth element includes two key value pairs. Each parameter value shown in FIG. 4C includes three parts with the same composition pattern, and the three parts are separated by commas. N or Y is assigned to each parameter value shown in FIG. 4D. Each parameter value shown in FIG. 4E includes "character", "@", and "value". Each parameter value shown in FIG. 4F has a common start part "public".

After the parameter values of each parameter in each method are obtained, in 220, common information is extracted from the corresponding parameter values for each parameter in each method. In the present specification, the common information can include, for example, a common pattern that can be abstracted based on the parameter values, a specific value or value type of each pattern element in the common pattern, or common content of the parameter values. Herein, the term "pattern" can be a parameter composition style. For example, the common pattern can be abstracted by tokenizing the parameter values, and a specific value or value type of each pattern element in the common pattern can be obtained. In the present specification, each specific value can be referred to as one unique value.

In some implementations, classification can be performed based on parameter formats of the parameter during common information extraction. Each parameter type corresponding to one information extraction approach. Then, for each parameter type of each parameter, common information is extracted from all parameter values of the parameter having the parameter type based on an information extraction approach corresponding to the parameter type.

FIG. 5 is an example flowchart illustrating a common information extraction process 500 according to an implementation of the present specification.

As shown in FIG. 5, in 510, for each parameter in each method, parameter format parsing is respectively performed on parameter values of the parameter to determine parameter types of the parameter. It should be noted that for each parameter, the above parameter type determining process needs to be performed for all parameter values of the parameter.

In some implementations, examples of the parameter type can include but are not limited to a Struct type, an Unstruct type, and a Mixed type. The Struct type is a parameter type of which all parameter content of a parameter value is capable of undergoing format parsing. In some implementations, examples of the format parsing can include JSON format parsing, in other words, JSON format parsing can be performed on parameter content of a parameter value. For example, a json.loads function of python can be used to transform and parse the parameter content of the parameter value. The Unstruct type is a parameter type of which all parameter content of a parameter value is incapable of undergoing format parsing. For example, a parameter value incapable of undergoing JSON format parsing is considered to have the Unstruct type. The Mixed type is a parameter type of which a part of parameter content is capable of undergoing format parsing and a part of the parameter content is incapable of undergoing format parsing. In the present specification, the Struct type, the Unstruct type, and the Mixed type can also be referred to as a first type, a second type, and a third type respectively.

In some implementations, the Struct type can be further divided into a dictionary format type and a list format type. Parameter content of a parameter value of the dictionary format type can include a plurality of key value pairs. The dictionary format type can include, for example, a json_large type. Parameter content of a parameter value of the json_large type has a json dictionary format, for example, the parameter values shown in FIG. 4A. Parameter content of a parameter value of the list format type can include a plurality of elements listed in a form of a list. The list format type can include, for example, a json_middle type. Parameter content of a parameter value of the json_middle type has a json list format, for example, the parameter values shown in FIG. 4B.

In some implementations, the Unstruct type can be further divided into a Self_similar type, an Enu type, a Pattern type, and a Common_Start type. The Self_similar type means that parameter content of each parameter value of a parameter can be abstracted into a plurality of parts having the same pattern. For example, the parameter values shown in FIG. 4C are of the Self_similar type, and parameter content of each parameter value of the parameter includes three parts separated by commas, namely, today123, today234, and today1234. Each part can be abstracted into the same pattern, namely, "character+value". The Enu type is a parameter type of which all parameter content of parameter values is strings and the number of different unique values of the corresponding strings is less than a predetermined threshold. For example, the parameter values shown in FIG. 4D are of the Enu type. In the parameter values, unique values of strings are "N" and "Y", in other words, there are two unique values. The Pattern type is a parameter type of which parameter content of each parameter value of a parameter can be abstracted into a pattern. In the Pattern type, the parameter content of each parameter value cannot be divided into parts that can be abstracted into the same pattern. For example, the parameter values shown in FIG. 4E are of the Pattern type, and each parameter value can be abstracted into a pattern of c @d, but parameter content of each parameter value cannot be divided into parts that can be abstracted into the same pattern. The Common_Start type is a parameter type of which parameter content of parameter values cannot be abstracted into a pattern but has a common start part. For example, the parameter values shown in FIG. 4F are of the Common_Start type.

In some implementations, each parameter can be of one parameter type. In some implementations, each parameter can be of a plurality of parameter types. For example, assuming that parameter A has 100 parameter values, where a parameter type of 50 parameter values can be the Enu type, and the remaining 50 parameter values can be of the Pattern type, parameter A can have two parameter types, namely, the Enu type and the Pattern type.

After the parameter type of each parameter is determined above, in 520, for each parameter type of each parameter, common information is extracted from parameter values of the parameter having the parameter type by using an information extraction approach corresponding to the parameter type. When a parameter has a plurality of parameter types, for each parameter type, common information can be extracted from all parameter values of the parameter having the parameter type based on a corresponding information extraction approach. As such, the corresponding common information is extracted for each parameter type. Therefore, the parameter can have a plurality of pieces of common information. When a parameter has one parameter type, common information can be extracted from all parameter values of the parameter based on a corresponding information extraction approach.

Figures 6, 7:
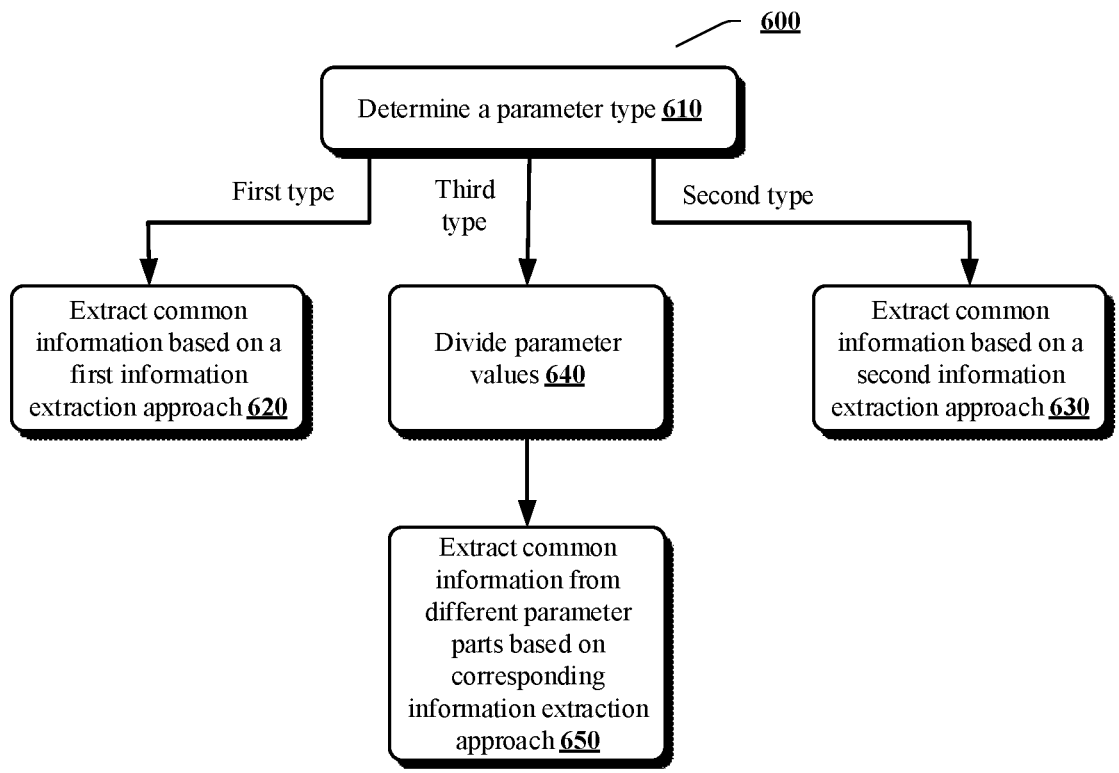
FIG. 6 is an example flowchart illustrating a common information extraction process according to an implementation of the present specification.
FIG. 7 is an example schematic diagram illustrating a template style according to an implementation of the present specification.

FIG. 6 is an example flowchart illustrating a common information extraction process 600 according to an implementation of the present specification. In the implementation shown in FIG. 6, parameter types include a Struct type, an Unstruct type, and a Mixed type, namely, a first type, a second type, and a third type shown in FIG. 6.

As shown in FIG. 6, in 610, for each parameter in each method, parameter format parsing is respectively performed on parameter values of the parameter to determine parameter types of the parameter.

In response to that the determined parameter type is the Struct type, in 620, common information is extracted from the parameter values of the parameter based on an information extraction approach (a first information extraction approach) corresponding to the Struct type.

For example, if the parameter type is a dictionary format type, for example, json_large, for each parameter, patterns can be extracted from keys in key value pairs of all parameter values of the parameter. If the same pattern exists, pattern merging is performed. In addition, for each pattern, respective values of keys corresponding to the pattern are further extracted. If the number of unique values in the values of the keys corresponding to the pattern is less than a predetermined threshold, it is considered that the keys corresponding to the pattern are of an enumerated type, and therefore, all unique values of the corresponding keys are extracted. If the number of unique values in the values of the keys corresponding to the pattern is not less than a predetermined threshold, it is considered that the keys corresponding to the pattern are of an infinite type, and therefore, value types such as a list type, a dictionary type, and a number type of the corresponding keys are extracted. In addition, value types of values in key value pairs corresponding to each pattern are further extracted. If there are a plurality of different value types in extracted value types of keys or the values in the key value pairs, a value type that can have backward compatibility is selected as an extracted value type. Herein, that value type A is backward compatible with value type B means that the definition range of value type A can include the definition range of value type B. For example, if the extracted value types include a character type and the number type, the character type is selected as an extracted value type. In addition, the number (length) "dict_len" of key value pairs is extracted.

For example, for the parameter values shown in FIG. 4A, a parameter type of the parameter is the json_large type, and keys in all the parameter values can be abstracted into the same pattern, namely, {"c"}, where c represents a string. In addition, values corresponding to the keys in all the parameter values are two unique values, and the number of unique keys is less than the predetermined threshold (assume that the predetermined threshold is 5), and therefore, all values "a" and "b" of the keys are extracted. In addition, a value type of the values in the key value pairs is the number type, and the number, dict_len, of key value pairs is "2". Therefore, for the parameter example of FIG. 4A, extracted common information includes the number, dict_len, of key value pairs, namely, "2", the pattern corresponding to the key, namely, "c", values of keys corresponding to each pattern, namely, "a" and "b", and the value type of the values in the key value pairs, namely, "number".

If the parameter type is json_middle, for each element in each parameter, it is determined whether the element is of a common type or the json_large type during common information extraction. If the element is of the json_large type, common information is extracted based on a method corresponding to json_large. For common-type elements, if the number of elements is less than a predetermined threshold, the common-type elements are considered to be enumerated-type elements, and therefore, values of all common-type elements are extracted. If the number of elements is not less than a predetermined threshold, it is determined that the common-type elements are of a non-enumerated type. In this case, the common-type elements need to be tokenized, so that a corresponding pattern is abstracted and extracted. For each pattern element in the extracted pattern, if the number of unique values corresponding to the pattern element is less than the predetermined threshold, all unique values corresponding to the pattern element are extracted. If the number of unique values corresponding to the pattern element is not less than the predetermined threshold, value types corresponding to values of the pattern element are extracted. In addition, the number of elements included in the parameter value further needs to be extracted.

For example, for the parameter values shown in FIG. 4B, the first three elements are strings, and are of the common type, and the fourth element is of the json_large type including two key value pairs. Therefore, common information is extracted for the fourth element based on the method corresponding to json_large. For the first three elements, because the number of unique values is not less than the predetermined threshold (assume that the predetermined threshold is 3), pattern extraction needs to be performed, and therefore, a common pattern, namely, {"cd"}, is extracted, where c represents a string, and d represents a value. In addition, unique values corresponding to c are "today" and "yestoday", and the number of unique values is less than the predetermined threshold (assume that the predetermined threshold is 5), and therefore, all values, namely, "today" and "yestoday", are extracted. Unique values corresponding to d are "123", "234", and "1234", and the number of unique values is less than the predetermined threshold 5, and therefore all unique values, namely, "123", "234", and "1234", are extracted. In addition, the number of elements, namely, 4, is further extracted. It can be seen that, for the parameter example of FIG. 4B, common information extracted for a json_large-type element can include the number, dict_len, of key value pairs, namely, "2", the pattern corresponding to the key, namely, "c", values of keys corresponding to each pattern, namely, "a" and "b", and the value type of the values in the key value pairs, namely, "number". Common information extracted for a common-type element can include a pattern, values of "c" and "d" in the pattern, and the number of elements in the parameter value.

In response to that the determined parameter type is the Unstruct type, in 630, common information is extracted from the parameter values of the parameter based on an information extraction approach (a second information extraction approach) corresponding to the Unstruct type.

For example, if the parameter type is Self_similar, each element in the parameter value is tokenized, so that a pattern is abstracted and extracted. For each pattern element in the extracted pattern, if the number of unique values corresponding to the pattern element is less than the predetermined threshold, all unique values corresponding to the pattern element are extracted. If the number of unique values corresponding to the pattern element is not less than the predetermined threshold, value types corresponding to values of the pattern element are extracted. In addition, in some implementations, the number of elements in the parameter value further needs to be extracted.

For example, in the example of FIG. 4C, each parameter value is "today123, today234, today1234", and a parameter type of the parameter value is Self_similar. For the example of FIG. 4C, the parameter value is divided into three parts, namely, "today123", "today234", and "today1234", and then each part is tokenized, and therefore, a pattern, namely, "cd", is abstracted and extracted, where c represents the character type, and d represents the number type. For the pattern element "c" in the extracted pattern, a corresponding unique value is "today", and the number of unique values is less than the predetermined threshold (assume that the predetermined threshold is 5), and therefore, all values, namely, "today", are extracted. For the pattern element "d" in the extracted pattern, corresponding unique values are "123", "234", and "1234", and the number of unique values is less than the predetermined threshold, and therefore, all unique values, namely, "123", "234", and "1234", are extracted. In addition, in some implementations, the number "3" of elements in the parameter value further needs to be extracted.

If the parameter type is Enu, all possible parameter values of the parameter are extracted. For example, a parameter type of the parameter shown in FIG. 4D is Enu, and therefore all parameter values, namely, "N/Y", are extracted. If the parameter type is Pattern, parameter content of each parameter value is tokenized, and therefore, a pattern is abstracted, and then the pattern and all possible values of pattern elements in the pattern are extracted. For example, a parameter type of the parameter shown in FIG. 4E is the Pattern type. Parameter content of each parameter value is tokenized, and therefore, a pattern, namely, "c @d", is abstracted, where the value of c is "public", and values of d are "123", "345", and "234".

If the parameter type is Common_Start, common start parts of all parameter values or most parameter values are extracted for each parameter. For example, a parameter type of the parameter shown in FIG. 4F is Common_Start, and extracted common information includes a common start part "public".

In response to that the determined parameter type is the Mixed type, in 640, the parameter values of the parameter are divided into a first parameter part whose parameter type is the Struct type and a second parameter part whose parameter type is the Unstruct type. Then, in 650, common information (first common information) is extracted from the first parameter part based on the first information extraction approach corresponding to the Struct type, and common information (second common information) is extracted from the second parameter part based on the second information extraction approach corresponding to the Unstruct type. The first common information and the second common information are used as final common information.

In some implementations, each parameter type can have a corresponding template style, for example, correspond to one or more template styles. In the present specification, the template style can include a template information composition and a recording format of each piece of template information.

FIG. 7 is an example schematic diagram illustrating a template style according to an implementation of the present specification. In the example of FIG. 7, each row represents one template style.

In FIG. 7, a template style of the first row is a template style corresponding to the json_large type. In the template style, extracted template information includes the number "dict_len" of key value pairs, a pattern "key_pattern" corresponding to a key, and all possible values "key_value" of "key_pattern". For example, for the parameter example shown in FIG. 4A, the number of key value pairs is 2. The pattern corresponding to the key is "c", and all possible values of "c" are "a" and "b". A value type corresponding to a value in the key value pair is "number". Therefore, an obtained template is {'dict_len':{2}, 'key_pattern':[{'c': 'number'}], 'key_value':[[a, b]] }.

A template style of the second row is a template style corresponding to the json_middle type. For the parameter example shown in FIG. 4B, the first three elements are of the common type, and a corresponding style is the second half of the template style of the second row. The fourth element is of the json_large format, a corresponding style is the first half of the template style of the second row, and template information is extracted and recorded based on a method corresponding to the json_large type. Therefore, an obtained template is {'element':[{'pattern':'cd', 'value':[[today, yestoday]:[123, 234, 1234]]}], 'json_large':{'dict_len':{2}, 'key_pattern':[{'c':'number'}], 'key_value':[[a, b]] }, count:{4} }.

A template style of the third row is a template style corresponding to the Enu type. In the template style, extracted template information includes all possible values, and all the extracted possible values are recorded in a template in a form of list elements. For the parameter example shown in FIG. 4D, an obtained template is {'value': [N, Y] }.

A template style of the fourth row is a template style corresponding to the Self_similar type. In the template style, extracted template information includes a pattern (namely, d), all possible values of pattern elements in the pattern, and the number of elements included. For the parameter example shown in FIG. 4C, an obtained template is {'pattern':'cd', 'value':[[today], [123, 234, 1234]], count:{3} }, where the value of c is "today", values of d are "123", "234", and "1234", and the number of elements is "3".

A template style of the fifth row is a template style corresponding to the Pattern type. In the template style, extracted template information includes a pattern (namely, c@d), all possible values of c, and all possible values of d. For the parameter example shown in FIG. 4D, an obtained template is {'pattern':'c@d', 'value':[[public], [123, 345, 234]]}, where the value of c is "today", and values of d are "123", "234", and "1234".

A template style of the sixth row is a template style corresponding to the Common_Start type. In the template style, extracted template information includes a common start part. The extracted common start part is recorded in a template as the only element of the template. For the parameter example shown in FIG. 4F, an obtained template is {'common_stare':'public'}.

The template style can be pre-generated or generated in real time by analyzing parameter values. In the case of the presence of the template style, during common information extraction, for each parameter in each method, template information needed for a corresponding template style can be extracted from parameter values of the parameter as common information of the parameter.

Returning to FIG. 2, after the common information is extracted as above, in 230, a corresponding regular expression is generated for each parameter in each method code block based on the extracted common information. In this method of generating a regular expression, the generated regular expression can reflect all the extracted common information. In some implementations, a parameter can be of a plurality of parameter types. In this case, for each parameter type, one regular expression is generated based on extracted corresponding common information.

In some implementations, for example, a corresponding matching condition can be generated for each piece of template information, and obtained matching conditions can be combined by using a logical operator, so that a regular expression is generated.

Figure 8:
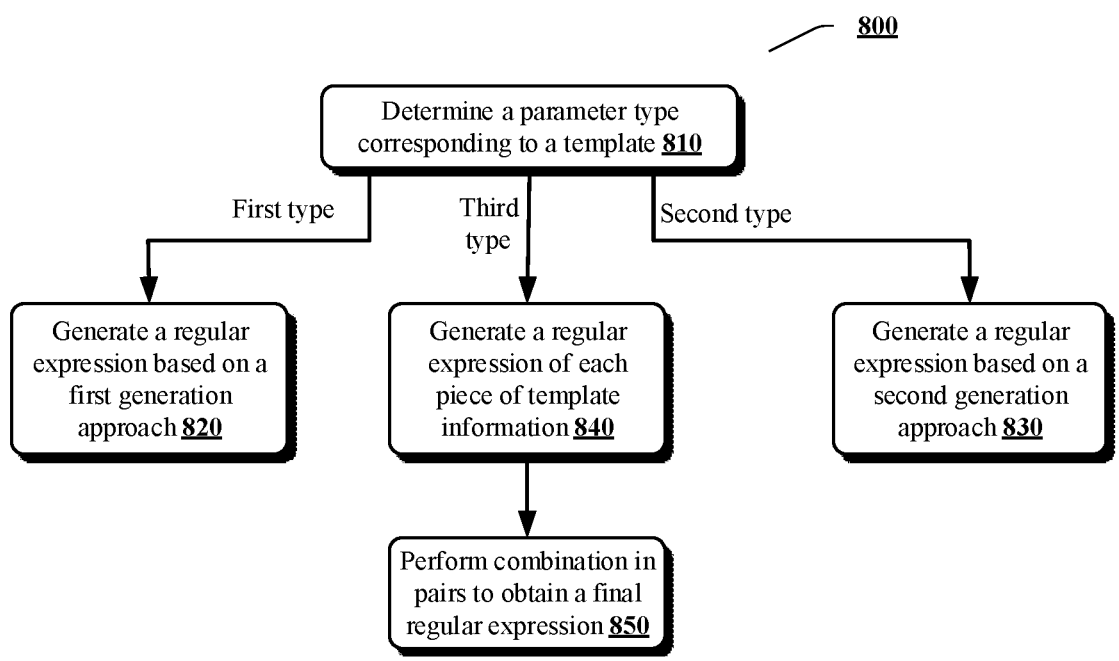
FIG. 8 is an example schematic diagram illustrating a regular expression generation process according to an implementation of the present specification.

FIG. 8 is an example schematic diagram illustrating a regular expression generation process according to an implementation of the present specification. In the implementation shown in FIG. 8, parameter types include a Struct type, an Unstruct type, and a Mixed type, and each parameter type corresponds to one or more templates.

As shown in FIG. 8, in 810, for each template, a parameter type corresponding to the template is determined.

In response to that the parameter type corresponding to the template is the Struct type, in 820, a regular expression is generated based on template information of the template and a regular expression generation approach corresponding to the Struct type. For example, a matching condition is generated for each piece of template information, and obtained matching conditions are combined by using a logical operation, so that the regular expression is generated.

In response to that the parameter type corresponding to the template is the Unstruct type, in 830, a regular expression is generated based on template information of the template and a regular expression generation approach corresponding to the Unstruct type. Specifically, a character-type value and a number-type value are obtained from the template information of the template by using a double-pointer access method Then the regular expression is generated based on the obtained character-type value and number-type value. For example, assuming that the template is {pattern:"c @d", value:[[public], [123, 345, 234]]}, initially, the first pointer in double pointers points to "c" in "c @d", and the second pointer points to the first element, namely, [public], in a corresponding list of values, and then template information in [public] is obtained. Next, the two pointers are shifted to the right at the same time, and template information is obtained to generate a corresponding regular expression. For example, the first pointer points to "@", and the second pointer stays still. Then the first pointer points to "d", and the second pointer points to "[123, 345, 234]". Therefore, template information in [123, 345, 234] is obtained.

In response to that the parameter type corresponding to the template is the Mixed type, in 840, a first regular expression is generated based on the regular expression generation approach corresponding to the Struct type and template information (namely, first common information) extracted from the template information of the template based on an information extraction approach corresponding to the Struct type, and a second regular expression is generated based on the regular expression generation approach corresponding to the Unstruct type and template information (namely, second common information) extracted from the template information of the template based on an information extraction approach corresponding to the Unstruct type. Next, in 850, the obtained first regular expression and second regular expression are combined to obtain a regular expression corresponding to the template.

It should be noted that in the example of FIG. 8, one regular expression is generated for each template. The extracted common information, the extracted template, and the generated regular expression are described below by taking the parameter examples shown in FIG. 4A to FIG. 4F as examples.

For example, for the parameter example shown in FIG. 4A, in extracted common information, the number of key value pairs is 2. A pattern corresponding to a key is "c", all possible values of "c" are "a" and "b", and a value type corresponding to values in the key value pairs is "number". Therefore, an obtained template is {'dict_len':{2}, 'key_pattern':[{'c':'number'}], 'key_value':[[a, b]] }, so that a regular expression "\{((a|b):[\d]+,?){2}}" is obtained.

For the parameter example shown in FIG. 4B, common information extracted for a json_large-type element can include the number, dict_len, of key value pairs, namely, "2", a pattern corresponding to a key, namely, "c", values of keys corresponding to each pattern, namely, "a" and "b", and a value type of values in the key value pairs, namely, "number". Common information extracted for a common-type element can include a pattern, namely, "cd", values of "c" in the pattern, namely, "today" and "yestoday", values of "d", namely, "123", "234", and "1234", and the number of elements in the parameter value, namely, "4". Therefore, a template is generated:{'element':'pattern':'cd', 'value':[[today, yestoday]:[123, 234, 1234]]}], 'json_large':{'dict_len':{2}, 'key_pattern':[{'c':'number' } ], 'key_value':[[a, b]]}, count:{4} }. Then a regular expression "\[\{(((a|b):[\d]+,?) {2} \ },?)|((today|yestoday)([\d]{3,4},?){4} \]" is obtained based on template information of the template.

For the parameter example shown in FIG. 4C, in extracted template information, a pattern is "cd", the value of "c" is "today", values of d are "123", "234", and "1234", and the number of elements is "3". Therefore, an obtained template is {'pattern':'cd', 'value':[[today], [123, 234, 1234]], count: {3} }, so that a regular expression ((today)[\d]+,?){3} is obtained.

For the parameter example shown in FIG. 4D, extracted common information includes "N" and "Y". Therefore, a corresponding template {"value":[N, Y] } is generated, so that a regular expression (N)|(Y) is generated.

For the parameter example shown in FIG. 4E, in extracted template information, a pattern is "c @d", the value of "c" is "today", values of d are "123", "234", and "1234", and the number of elements is "3". Therefore, an obtained template is |'pattern':'c @d', 'value':[[public], [123, 345, 234] }, so that a regular expression (public)\ @[\d] +,?){3} is obtained.

For the parameter example shown in FIG. 4F, extracted template information includes "public". Therefore, an obtained template is {'common_start':'public'}, so that a regular expression ^(public) [\w\W]* is obtained.

In some implementations, after the regular expression of each parameter in each method of the application system is generated as above, in 240, the generated regular expression is stored in a regular expression database in association with both a method and a parameter. For example, a unique parameter id can be assigned to each parameter in each method. The parameter id is used to uniquely identify each parameter in each method of the application system. For example, the parameter id can be represented as an application system name.method name.parameter name or application system name.interface name.method name.parameter name.

According to the above regular expression generation solution, common information is extracted from historical configuration data of a parameter, and a regular expression of the parameter is generated based on the common information, instead of generating one regular expression based on each piece of parameter configuration data of each parameter, so that the number of regular expressions corresponding to each parameter can be reduced while shortening the length of the generated regular expression, thereby reducing the matching complexity in performing parameter validity check.

According to the above regular expression generation solution, parameter format parsing is performed on parameter values to determine a parameter type, and common information is extracted from the parameter values based on an information extraction approach corresponding to the parameter type, so that the efficiency and the accuracy of common information extraction can be improved.

According to the above regular expression generation solution, parameter format parsing is performed on parameter values to determine a parameter type, and common information is extracted from the parameter values based on a template style corresponding to the parameter type, so that the efficiency and the accuracy of common information extraction can be further improved.

According to the above regular expression generation solution, parameter format parsing is performed on parameter values to determine a parameter type, and a regular expression is generated based on template information of a template and a regular expression generation approach corresponding to the parameter type, so that the efficiency of regular expression generation can be further improved.

After the regular expression is generated and stored as above, parameter validity check can be performed based on the generated regular expression.

Figure 9:
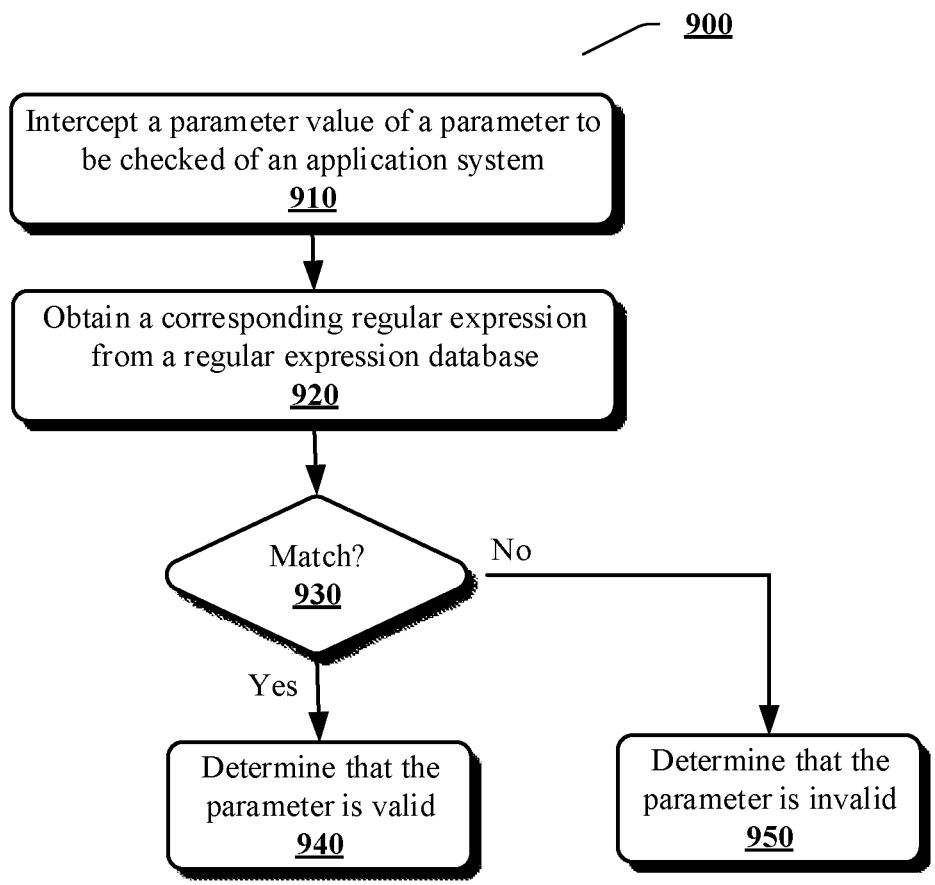
FIG. 9 is an example flowchart illustrating a method of checking validity of a parameter according to an implementation of the present specification.

FIG. 9 is an example flowchart illustrating a method 900 of checking validity of a parameter according to an implementation of the present specification.

As shown in FIG. 9, in 910, a parameter value of a parameter to be checked of an application system is intercepted. The parameter to be checked is a parameter in a target method in the application system. For example, the parameter value of the parameter to be checked of the application system can be intercepted by using message middleware SofaMQ. The interception operation can be performed in response to a parameter debugging operation of the application system or performed for a parameter change or parameter reconfiguration operation of the application system. Alternatively or additionally, the interception operation can be performed in response to a parameter validity check request. The parameter validity check request includes a parameter id of the parameter to be checked.

In 920, a regular expression corresponding to the parameter to be checked is obtained from a regular expression database. For example, the corresponding regular expression can be obtained from the regular expression database by using the parameter id of the parameter to be checked. One or more regular expressions can be obtained.

Then parameter validity check is performed based on the intercepted parameter value and the obtained regular expression. Specifically, in 930, it is determined whether the intercepted parameter value matches the obtained regular expression. In response to that the intercepted parameter value matches the obtained regular expression, in 940, it is determined that the parameter to be checked is a valid parameter. In response to that the intercepted parameter value does not match the obtained regular expression, in 950, it is determined that the parameter to be checked is an invalid parameter. Herein, "match" can also be referred to as "satisfy", to be specific, an element value of each element in the intercepted parameter value satisfies a corresponding determining condition in the regular expression.

Figure 10:
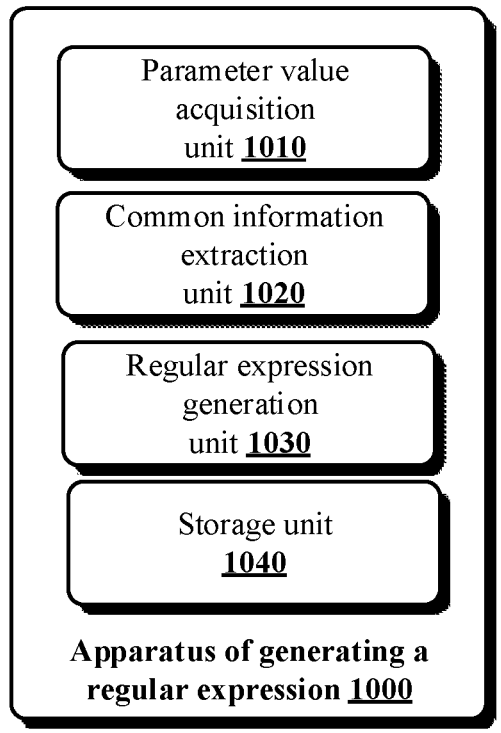
FIG. 10 is an example block diagram illustrating an apparatus of generating a regular expression according to an implementation of the present specification.

FIG. 10 is an example block diagram illustrating an apparatus 1000 of generating a regular expression according to an implementation of the present specification. As shown in FIG. 10, the apparatus 1000 of generating a regular expression includes a parameter value acquisition unit 1010, a common information extraction unit 1020, and a regular expression generation unit 1030.

The parameter value acquisition unit 1010 is configured to obtain parameter values of each parameter in each method code block from a historical implementation of an application system. For the operation of the parameter value acquisition unit 1010, references can be made to the operation described above with reference to 210 in FIG. 2.

The common information extraction unit 1020 is configured to extract common information from the corresponding parameter values for each parameter in each method code block. For the operation of the common information extraction unit 1020, references can be made to the operation described above with reference to 220 in FIG. 2.

The regular expression generation unit 1030 is configured to generate corresponding regular expressions for each parameter in each method code block based on the extracted common information. The generated regular expressions can reflect all the extracted common information. For the operation of the regular expression generation unit 1030, references can be made to the operation described above with reference to 230 in FIG. 2.

In addition, in some implementations, the apparatus 1000 of generating a regular expression can include a storage unit 1040. The storage unit 1040 is configured to store the generated regular expression in a regular expression database in association with both a method code block and a parameter.

Figure 11:
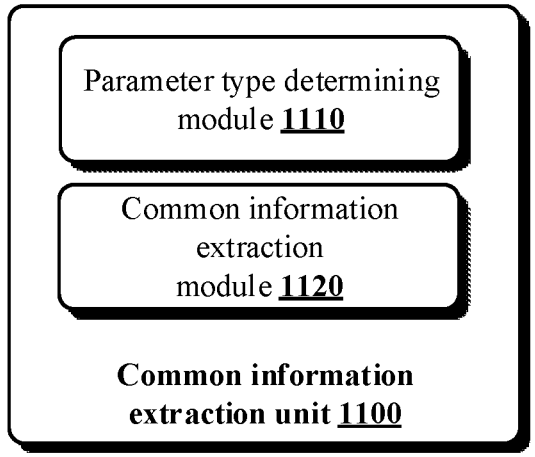
FIG. 11 is an example block diagram illustrating a common information extraction unit according to an implementation of the present specification.

FIG. 11 is an example block diagram illustrating a common information extraction unit 1100 according to an implementation of the present specification. As shown in FIG. 11, the common information extraction unit 1100 includes a parameter type determining module 1110 and a common information extraction module 1120.

The parameter type determining module 1110 is configured to perform, for each parameter in each method code block, parameter format parsing on parameter values of the parameter to determine a parameter type of the parameter.

The common information extraction module 1120 is configured to extract, for each parameter type of each parameter, common information corresponding to the parameter type from parameter values of the parameter having the parameter type by using an information extraction approach corresponding to the parameter type.

In some implementations, each parameter type has a corresponding template style, and the template style includes a template information composition and a recording format of each piece of template information. The common information extraction module 1120 performs, for each parameter type of each parameter in each method code block, template extraction on parameter values of the parameter having the parameter type based on a corresponding template style. Extracted template information in the template style is used as common information corresponding to the parameter type. Correspondingly, the regular expression generation unit 1030 generates a corresponding regular expression for each template corresponding to each parameter in each method code block based on template information of the template.

In some implementations, each parameter type has a corresponding regular expression generation approach. Correspondingly, the regular expression generation unit 1030 generates the corresponding regular expression for each template corresponding to each parameter in each method code block based on the template information of the template and a regular expression generation approach corresponding to a parameter type of the parameter.

In some implementations, the parameter type includes a Struct type of which all parameter content of a parameter value is capable of undergoing format parsing, an Unstruct type of which all parameter content of a parameter value is incapable of undergoing format parsing, and a Mixed type of which a part of parameter content of a parameter value is capable of undergoing format parsing and a part of the parameter content is incapable of undergoing format parsing.

In response to that the determined parameter type is the Struct type, the common information extraction unit 1020 extracts common information from parameter values of the parameter having the Struct type based on an information extraction approach corresponding to the Struct type. In response to that the determined parameter type is the Unstruct type, the common information extraction unit 1020 extracts common information from parameter values of the parameter having the Unstruct type based on an information extraction approach corresponding to the Unstruct type. In response to that the determined parameter type is the Mixed type, the common information extraction unit 1020 divides parameter values of the parameter having the Mixed type into a first parameter part whose parameter type is the Struct type and a second parameter part whose parameter type is the Unstruct type, extracts common information from the first parameter part based on the information extraction approach corresponding to the Struct type, and extracts common information from the second parameter part based on the information extraction approach corresponding to the Unstruct type.

In some implementations, if the parameter type corresponds to a template, for a template corresponding to a parameter whose parameter type is the Struct type, the regular expression generation unit 1030 generates a regular expression based on template information of the template and a regular expression generation approach corresponding to the Struct type. For a template corresponding to a parameter whose parameter type is the Unstruct type, the regular expression generation unit 1030 generates a regular expression based on template information of the template and a regular expression generation approach corresponding to the Unstruct type. For a template corresponding to a parameter whose parameter type is the Mixed type, the regular expression generation unit 1030 generates a first regular expression based on the regular expression generation approach corresponding to the Struct type and template information extracted from the template information of the template based on an information extraction approach corresponding to the Struct type, and generates a second regular expression based on the regular expression generation approach corresponding to the Unstruct type and template information extracted from the template information of the template based on an information extraction approach corresponding to the Unstruct type. Then the regular expression generation unit 1030 combines the obtained first regular expression and second regular expression to obtain a regular expression corresponding to the template.

In some implementations, the format parsing includes JSON format parsing. Correspondingly, for the template corresponding to the parameter whose parameter type is the Unstruct type, the regular expression generation unit 1030 obtains a character-type value and a number-type value from the template information of the template by using a double-pointer access method, and generates the regular expression based on the obtained character-type value and number-type value and the regular expression generation approach corresponding to the Unstruct type.

Figure 12:
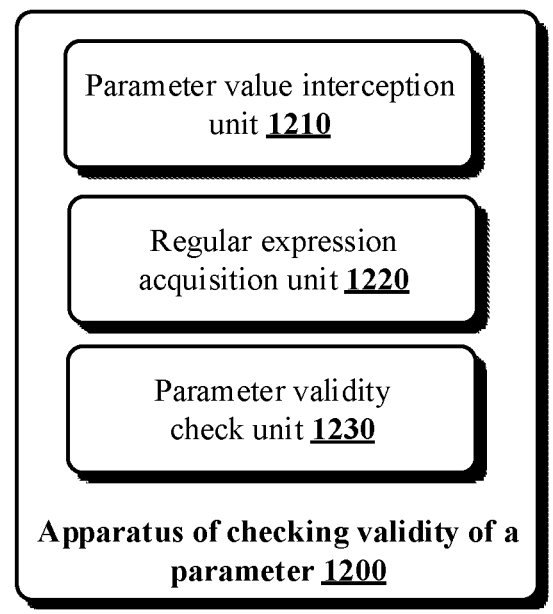
FIG. 12 is an example block diagram illustrating an apparatus of checking validity of a parameter according to an implementation of the present specification.

FIG. 12 is an example block diagram illustrating an apparatus 1200 of checking validity of a parameter according to an implementation of the present specification. As shown in FIG. 12, the apparatus 1200 of checking validity of a parameter includes a parameter value interception unit 1210, a regular expression acquisition unit 1220, and a parameter validity check unit 1230.

The parameter value interception unit 1210 is configured to intercept a parameter value of a parameter to be checked of an application system. The parameter to be checked is a parameter in a target method code block of the application system. For the operation of the parameter value interception unit 1210, references can be made to the operation described above with reference to 910 in FIG. 9.

The regular expression acquisition unit 1220 is configured to obtain a regular expression corresponding to the parameter to be checked from a regular expression database. For the operation of the regular expression acquisition unit 1220, references can be made to the operation described above with reference to 920 in FIG. 9.

The validity check unit 1230 is configured to perform parameter validity check based on the intercepted parameter value and the obtained regular expression. The validity check unit 1230 determines that the parameter is a valid parameter in response to that the intercepted parameter value matches the obtained regular expression, and the validity check unit 1230 determines that the parameter to be checked is an invalid parameter in response to that the intercepted parameter value does not match the obtained regular expression.

The method of generating a regular expression, the apparatus of generating a regular expression, the method of checking validity of a parameter, and the apparatus of checking validity of a parameter according to implementations of the present specification are described above with reference to FIG. 1 to FIG. 12. The above apparatus of generating a regular expression and apparatus of checking validity of a parameter can be implemented in hardware, or can be implemented in software or a combination of hardware and software.

Figure 13:
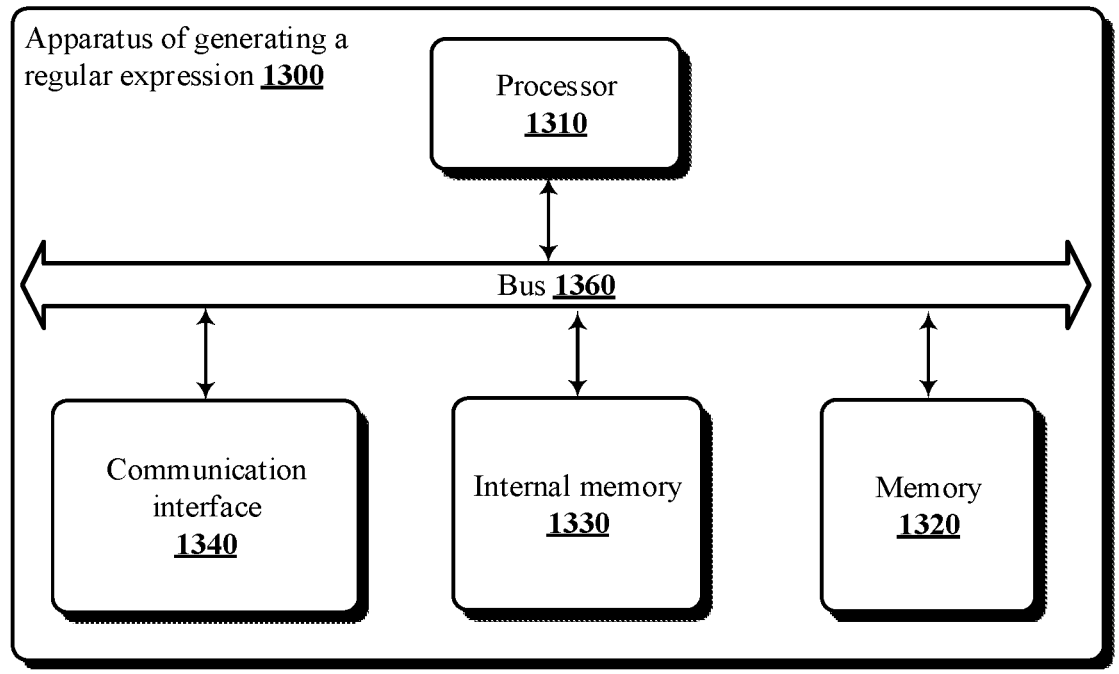
FIG. 13 is an example schematic diagram of an apparatus of generating a regular expression implemented based on a computer system according to an implementation of the present specification.

FIG. 13 is a schematic diagram of an apparatus 1300 of generating a regular expression implemented based on a computer system according to an implementation of the present specification. As shown in FIG. 13, the apparatus 1300 of generating a regular expression can include at least one processor 1310, a memory (for example, a non-volatile memory) 1320, an internal memory 1330, and a communication interface 1340, and the at least one processor 1310, the memory 1320, the internal memory 1330, and the communication interface 1340 are connected together through a bus 1360. The at least one processor 1310 executes at least one computer-readable instruction (for example, the above element implemented in a form of software) stored or encoded in the memory.

In an implementation, computer-executable instructions are stored in the memory, and when the computer-executable instructions are executed, the at least one processor 1310 is enabled to obtain parameter values of each parameter in each method code block from a historical implementation of an application system; extract common information from the corresponding parameter values for each parameter in each method code block; and generate a corresponding regular expression for each parameter in each method code block based on the extracted common information.

It should be understood that when the computer-executable instructions stored in the memory are executed, the at least one processor 1310 is enabled to perform the various operations and functions described above with reference to FIG. 1 to FIG. 12 in implementations of the present specification.

Figure 14:
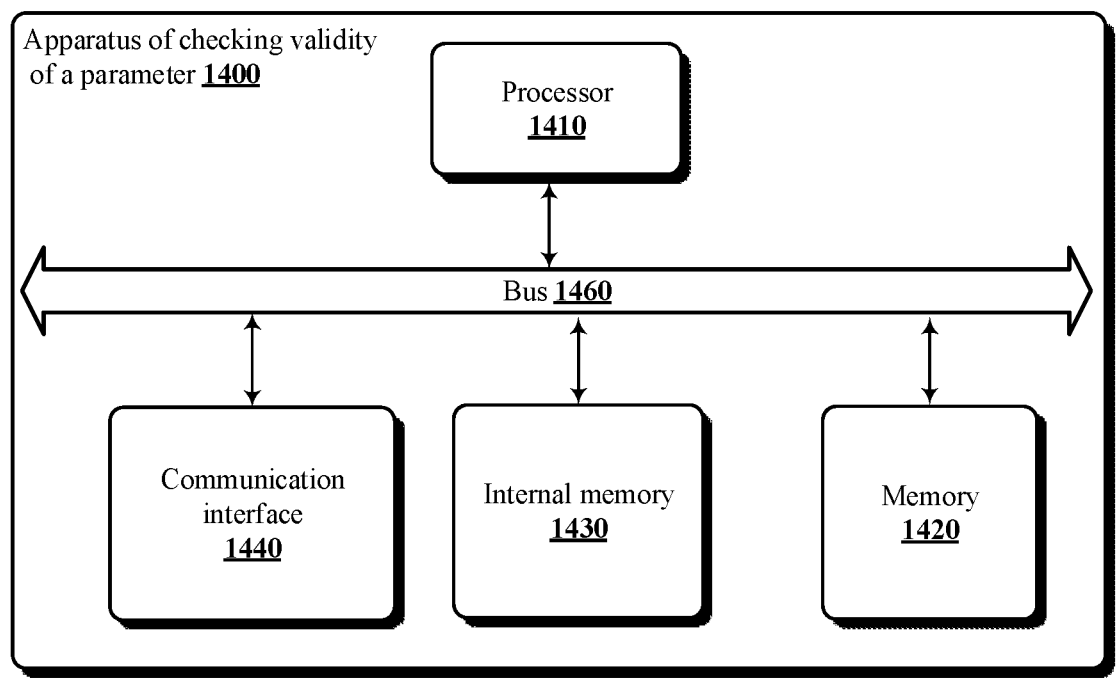
FIG. 14 is an example schematic diagram illustrating an apparatus of checking validity of a parameter implemented based on a computer system according to an implementation of the present specification.

FIG. 14 is a schematic diagram illustrating an apparatus 1400 of checking validity of a parameter implemented based on a computer system according to an implementation of the present specification. As shown in FIG. 14, the apparatus 1400 of checking validity of a parameter can include at least one processor 1410, a memory (for example, a non-volatile memory) 1420, an internal memory 1430, and a communication interface 1440, and the at least one processor 1410, the memory 1420, the internal memory 1430, and the communication interface 1440 are connected together through a bus 1460. The at least one processor 1410 executes at least one computer-readable instruction (for example, the above element implemented in a form of software) stored or encoded in the memory.

In an implementation, computer-executable instructions are stored in the memory, and when the computer-executable instructions are executed, the at least one processor 1410 is enabled to intercept a parameter value of a parameter to be checked of an application system, where the parameter to be checked is a parameter in a target method code block of the application system; obtain a regular expression corresponding to the parameter to be checked from a regular expression database, where the regular expression is generated based on the method described above; and perform parameter validity check based on the intercepted parameter value and the obtained regular expression, where it is determined that the parameter to be checked is a valid parameter in response to that the intercepted parameter value matches the obtained regular expression, and it is determined that the parameter to be checked is an invalid parameter in response to that the intercepted parameter value does not match the obtained regular expression.

It should be understood that when the computer-executable instructions stored in the memory are executed, the at least one processor 1410 is enabled to perform the various operations and functions described above with reference to FIG. 1 to FIG. 12 in implementations of the present specification.

According to an implementation, a program product such as a machine-readable medium (for example, a non-transitory machine-readable medium) is provided. The machine-readable medium can have instructions (for example, the elements implemented in a form of software), and when the instructions are executed by a machine, the machine is enabled to perform the various operations and functions described above with reference to FIG. 1 to FIG. 12 in implementations of the present specification. Specifically, a system or an apparatus provided with a readable storage medium can be provided. Software program code implementing the functions in any one of the above implementations is stored in the readable storage medium, and a computer or a processor of the system or the apparatus is enabled to read and execute instructions stored in the readable storage medium.

In this case, the program code read from the readable medium can implement the functions of any one of the above implementations, and therefore, the machine-readable code and the readable storage medium storing the machine-readable code constitute a part of the present invention.

Examples of the readable storage medium include a floppy disk, a hard disk, a magneto-optical disk, an optical disk (for example, a CD-ROM, CD-R, CD-RW, a DVD-ROM, a DVD-RAM, or DVD-RW), a magnetic tape, a non-volatile memory card, and a ROM. In some implementations, the program code can be downloaded from a server computer or from the cloud by using a communication network.

According to an implementation, a computer program product is provided. The computer program product includes a computer program, and when the computer program is executed by a processor, the processor is enabled to perform the various operations and functions described above with reference to FIG. 1 to FIG. 12 in implementations of the present specification.

It should be appreciated by a person skilled in the art that various changes and modifications can be made to the implementations disclosed above without departing from the spirit of the present invention.

It should be noted that not all the steps and units in the above processes and system block diagrams are mandatory, and some steps or units can be ignored as actually needed. An execution sequence of the steps is not fixed, and can be determined as needed. The apparatus structures described in the above implementations can be physical structures or logical structures. For example, some units can be implemented by the same physical entity, or some units can be respectively implemented by a plurality of physical entities, or can be jointly implemented by some components in a plurality of independent devices.

In the above implementations, the hardware units or modules can be implemented mechanically or electrically. For example, a hardware unit, module, or processor can include dedicated permanent circuitry or logic (for example, a dedicated processor, FPGA, or ASIC) for performing a corresponding operation. The hardware unit or processor can further include programmable logic or circuitry (a general-purpose processor or another programmable processor), and can be temporarily arranged by software to perform a corresponding operation. A specific implementation (the mechanical way, or dedicated permanent circuitry, or temporarily arranged circuitry) can be determined based on cost and time considerations.

Example implementations have been described above with reference to the accompanying drawings, but do not represent all implementations that can be practiced or fall within the protection scope of the claims. The term "for example" used throughout the present specification means "being used as an example, an instance, or an illustration", and does not mean "being more preferred" or "being more advantageous" than other implementations. Specific implementations include specific details for the purpose of providing an understanding of the described technologies. However, these technologies can be practiced without these details. In some instances, well-known structures and apparatuses are shown in a form of block diagrams to avoid obscuring the concepts of the described implementations.

The above descriptions of the present disclosure are provided to enable any person of ordinary skill in the art to implement or use the present disclosure. Various modifications to the present disclosure are apparent to a person of ordinary skill in the art, and the general principles described herein can be applied to other variations without departing from the protection scope of the present disclosure. Therefore, the present disclosure is not limited to the examples and designs described herein, but is consistent with the widest scope in accordance with the principles and novel features disclosed herein.

What is claimed is:

1. A method of generating regular expressions for a plurality of parameters of different parameter types within a method code block on an application system, comprising:
    obtaining parameter values of each parameter in the method code block from a historical implementation of the application system;
    extracting common information from the corresponding parameter values for each parameter of the plurality of parameters in the method code block, wherein the extracting comprises:
    for each parameter in the method code block, performing a parameter parsing algorithm, the parameter parsing algorithm corresponding to a respective parameter type, and the performing the parameter parsing algorithm including:
        performing parameter format parsing on each parameter value to determine a parameter type based on whether all parameter content of a parameter value of the parameter is capable of undergoing format parsing, whether all parameter content of the parameter value of the parameter is incapable of format parsing, or whether part of the parameter content of the parameter value of the parameter is capable of undergoing format parsing and part of the parameter content of the parameter value of the parameter is incapable of undergoing format parsing; and extracting common information from the parameter values corresponding to their respective parameter types by using an extraction approach correspond to a respective parameter type, wherein each extraction approach is different for each parameter type; and generating a corresponding regular expression for each parameter of the plurality of parameters in the method code block based on its respective extracted common information and parameter type;

executing the method code block on the application system;

obtaining a parameter value of a parameter in the method code block on the application system during execution; and performing parameter validity check of the obtained parameter value based on whether the intercepted parameter value matches the generated regular expression for the respective parameter.

2. The method according to claim 1, wherein:

each parameter type has a corresponding template style, and the template style includes a template information composition and a recording format of each piece of template information;

the extracting the common information corresponding to the parameter type from the parameter values of the parameter having the parameter type by using the information extraction approach corresponding to the parameter type includes:

performing, template extraction on the parameter values of the parameter having the parameter type based on the corresponding template style to extract template information in the template style; and the generating the corresponding regular expression based on the extracted common information includes:

generating the corresponding regular expression based on template information.

3. The method according to claim 2, wherein the parameter type has a corresponding regular expression generation approach; and the generating the corresponding regular expression based on the template information includes:

generating the corresponding regular expression based on the template information and the regular expression generation approach corresponding to the parameter type of the parameter.

4. The method according to claim 1, wherein:

the parameter type includes a first type of which all parameter content of a parameter value is capable of undergoing format parsing, a second type of which all parameter content of a parameter value is incapable of undergoing format parsing, and a third type of which a part of parameter content of a parameter value is capable of undergoing format parsing and a part of the parameter content is incapable of undergoing format parsing; and the extracting the common information corresponding to the parameter type from the parameter values of the parameter having the parameter type by using the information extraction approach corresponding to the parameter type includes:

in response to that the parameter type is the first type, extracting common information from parameter values of the parameter having the first type based on an information extraction approach corresponding to the first type;

in response to that the parameter type is the second type, extracting common information from parameter values of the parameter having the second type based on an information extraction approach corresponding to the second type; and in response to that the determined parameter type is the third type, dividing parameter values of the parameter having the third type into a first parameter part whose parameter type is the first type and a second parameter part whose parameter type is the second type, extracting common information from the first parameter part based on the information extraction approach corresponding to the first type, and extracting common information from the second parameter part based on the information extraction approach corresponding to the second type.

5. The method according to claim 3, wherein:

the parameter type includes a first type of which all parameter content of a parameter value is capable of undergoing format parsing, a second type of which all parameter content of a parameter value is incapable of undergoing format parsing, and a third type of which a part of parameter content of a parameter value is capable of undergoing format parsing and a part of the parameter content is incapable of undergoing format parsing; and the generating the corresponding regular expression based on the template information and the regular expression generation approach corresponding to the parameter type of the parameter includes:

generating a regular expression corresponding to a parameter whose parameter type is the first type based on template information and a regular expression generation approach corresponding to the first type;

generating a regular expression corresponding to a parameter whose parameter type is the second type based on template information and a regular expression generation approach corresponding to the second type; and for a template style corresponding to a parameter whose parameter type is the third type, generating a first regular expression based on the regular expression generation approach corresponding to the first type and template information extracted based on an information extraction approach corresponding to the first type, generating a second regular expression based on the regular expression generation approach corresponding to the second type and template information extracted based on an information extraction approach corresponding to the second type, and combining the obtained first regular expression and second regular expression to obtain a regular expression corresponding to the template.

6. The method according to claim 5, wherein the format parsing includes JSON format parsing, and the generating the regular expression corresponding to the parameter whose parameter type is the second type based on the template information and the regular expression generation approach corresponding to the second type includes:

obtaining a character-type value and a number-type value from the template information by using a double-pointer access approach; and generating the regular expression based on the obtained character-type value and number-type value and the regular expression generation approach corresponding to the second type.

7. The method according to claim 1, comprising:
storing the generated regular expression in a regular expression database in association with the method code block and the parameter.

8. A computing system comprising one or more processors and one or more memory devices, the one or more memory devices having computer executable instructions stored thereon, the computer executable instructions when executed by the one or more processors enabling the one or more processors to implement acts including:
obtaining parameter values of each parameter in a method code block from a historical implementation of the application system, the method code block including a plurality of parameters of different parameter types;
extracting common information from the corresponding parameter values for each parameter of the plurality of parameters in the method code block, wherein the extracting comprises:
for each parameter in the method code block, performing a parameter parsing algorithm, the parameter parsing algorithm corresponding to a respective parameter type, and the performing the parameter parsing algorithm including:
performing parameter format parsing on each parameter value to determine a parameter type based on whether all parameter content of a parameter value of the parameter is capable of undergoing format parsing, whether all parameter content of the parameter value of the parameter is incapable of format parsing, or whether part of the parameter content of the parameter value of the parameter is capable of undergoing format parsing and part of the parameter content of the parameter value of the parameter is incapable of undergoing format parsing; and
extracting common information from the parameter values corresponding to their respective parameter types by using an extraction approach correspond to a respective parameter type, wherein each extraction approach is different for each parameter type;
generating a corresponding regular expression for each parameter of the plurality of parameters in the method code block based on its respective extracted common information and parameter type;
executing the method code block on the application system;
obtaining a parameter value of a parameter in the method code block on the application system during execution; and
performing parameter validity check of the obtained parameter value based on whether the intercepted parameter value matches the generated regular expression for the respective parameter.

9. The computing system according to claim 8, wherein:
each parameter type has a corresponding template style, and the template style includes a template information composition and a recording format of each piece of template information;
the extracting the common information corresponding to the parameter type from the parameter values of the parameter having the parameter type by using the information extraction approach corresponding to the parameter type includes:
performing, template extraction on the parameter values of the parameter having the parameter type based on the corresponding template style to extract template information in the template style; and
the generating the corresponding regular expression based on the extracted common information includes:
generating the corresponding regular expression based on template information.

10. The computing system according to claim 9, wherein the parameter type has a corresponding regular expression generation approach; and
the generating the corresponding regular expression based on the template information includes:
generating the corresponding regular expression based on the template information and the regular expression generation approach corresponding to the parameter type of the parameter.

11. The computing system according to claim 8, wherein:
the parameter type includes a first type of which all parameter content of a parameter value is capable of undergoing format parsing, a second type of which all parameter content of a parameter value is incapable of undergoing format parsing, and a third type of which a part of parameter content of a parameter value is capable of undergoing format parsing and a part of the parameter content is incapable of undergoing format parsing; and
the extracting the common information corresponding to the parameter type from the parameter values of the parameter having the parameter type by using the information extraction approach corresponding to the parameter type includes:
in response to that the parameter type is the first type, extracting common information from parameter values of the parameter having the first type based on an information extraction approach corresponding to the first type;
in response to that the parameter type is the second type, extracting common information from parameter values of the parameter having the second type based on an information extraction approach corresponding to the second type; and
in response to that the determined parameter type is the third type, dividing parameter values of the parameter having the third type into a first parameter part whose parameter type is the first type and a second parameter part whose parameter type is the second type, extracting common information from the first parameter part based on the information extraction approach corresponding to the first type, and extracting common information from the second parameter part based on the information extraction approach corresponding to the second type.

12. The computing system according to claim 10, wherein:
the parameter type includes a first type of which all parameter content of a parameter value is capable of undergoing format parsing, a second type of which all parameter content of a parameter value is incapable of undergoing format parsing, and a third type of which a part of parameter content of a parameter value is capable of undergoing format parsing and a part of the parameter content is incapable of undergoing format parsing; and
the generating the corresponding regular expression based on the template information and the regular expression generation approach corresponding to the parameter type of the parameter includes:
generating a regular expression corresponding to a parameter whose parameter type is the first type based on template information and a regular expression generation approach corresponding to the first type;

generating a regular expression corresponding to a parameter whose parameter type is the second type based on template information and a regular expression generation approach corresponding to the second type; and for a template style corresponding to a parameter whose parameter type is the third type, generating a first regular expression based on the regular expression generation approach corresponding to the first type and template information extracted based on an information extraction approach corresponding to the first type, generating a second regular expression based on the regular expression generation approach corresponding to the second type and template information extracted based on an information extraction approach corresponding to the second type, and combining the obtained first regular expression and second regular expression to obtain a regular expression corresponding to the template.

13. The computing system according to claim 12, wherein the format parsing includes JSON format parsing, and the generating the regular expression corresponding to the parameter whose parameter type is the second type based on the template information and the regular expression generation approach corresponding to the second type includes:

obtaining a character-type value and a number-type value from the template information by using a double-pointer access approach; and generating the regular expression based on the obtained character-type value and number-type value and the regular expression generation approach corresponding to the second type.

14. The computing system according to claim 8, wherein the acts include:

storing the generated regular expression in a regular expression database in association with the method code block and the parameter.

15. A non-transitory storage medium having computer executable instructions stored thereon, the computer executable instructions when executed by a processor enabling the processor to implement actions including:

obtaining parameter values of each parameter in a method code block from a historical implementation of the application system, the method code block including a plurality of parameters of different parameter types;

extracting common information from the corresponding parameter values for each parameter of the plurality of parameters in the method code block, wherein the extracting comprises;

for each parameter in the method code block, performing a parameter parsing algorithm, the parameter parsing algorithm corresponding to a respective parameter type, and the performing the parameter parsing algorithm including:

performing parameter format parsing on each parameter value to determine a parameter type based on whether all parameter content of a parameter value of the parameter is capable of undergoing format parsing whether all parameter content of the parameter value of the parameter is incapable of format parsing, or whether part of the parameter content of the parameter value of the parameter is capable of undergoing format parsing and part of the parameter content of the parameter value of the parameter is incapable of undergoing format parsing; and extracting common information from the parameter values corresponding to their respective parameter types by using an extraction approach correspond to a respective parameter type, wherein each extraction approach is different for each parameter type;

generating a corresponding regular expression for each parameter of the plurality of parameters in the method code block based on its respective extracted common information and parameter type;

executing the method code block on the application system;

obtaining a parameter value of a parameter in the method code block on the application system during execution; and performing parameter validity check of the obtained parameter value based on whether the intercepted parameter value matches the generated regular expression for the respective parameter.

16. The non-transitory storage medium according to claim 15, wherein:

each parameter type has a corresponding template style, and the template style includes a template information composition and a recording format of each piece of template information;

the extracting the common information corresponding to the parameter type from the parameter values of the parameter having the parameter type by using the information extraction approach corresponding to the parameter type includes:

performing, template extraction on the parameter values of the parameter having the parameter type based on the corresponding template style to extract template information in the template style; and the generating the corresponding regular expression based on the extracted common information includes:

generating the corresponding regular expression based on template information.

17. The non-transitory storage medium according to claim 16, wherein the parameter type has a corresponding regular expression generation approach; and the generating the corresponding regular expression based on the template information includes:

generating the corresponding regular expression based on the template information and the regular expression generation approach corresponding to the parameter type of the parameter.

18. The non-transitory storage medium according to claim 15, wherein:

the parameter type includes a first type of which all parameter content of a parameter value is capable of undergoing format parsing, a second type of which all parameter content of a parameter value is incapable of undergoing format parsing, and a third type of which a part of parameter content of a parameter value is capable of undergoing format parsing and a part of the parameter content is incapable of undergoing format parsing; and the extracting the common information corresponding to the parameter type from the parameter values of the parameter having the parameter type by using the information extraction approach corresponding to the parameter type includes:

in response to that the parameter type is the first type, extracting common information from parameter values of the parameter having the first type based on an information extraction approach corresponding to the first type;

in response to that the parameter type is the second type, extracting common information from parameter values of the parameter having the second type based on an information extraction approach corresponding to the second type; and in response to that the determined parameter type is the third type, dividing parameter values of the parameter having the third type into a first parameter part whose parameter type is the first type and a second parameter part whose parameter type is the second type, extracting common information from the first parameter part based on the information extraction approach corresponding to the first type, and extracting common information from the second parameter part based on the information extraction approach corresponding to the second type.

19. The computing system according to claim 17, wherein:

the parameter type includes a first type of which all parameter content of a parameter value is capable of undergoing format parsing, a second type of which all parameter content of a parameter value is incapable of undergoing format parsing, and a third type of which a part of parameter content of a parameter value is capable of undergoing format parsing and a part of the parameter content is incapable of undergoing format parsing; and the generating the corresponding regular expression based on the template information and the regular expression generation approach corresponding to the parameter type of the parameter includes:

generating a regular expression corresponding to a parameter whose parameter type is the first type based on template information and a regular expression generation approach corresponding to the first type;

generating a regular expression corresponding to a parameter whose parameter type is the second type based on template information and a regular expression generation approach corresponding to the second type; and for a template style corresponding to a parameter whose parameter type is the third type, generating a first regular expression based on the regular expression generation approach corresponding to the first type and template information extracted based on an information extraction approach corresponding to the first type, generating a second regular expression based on the regular expression generation approach corresponding to the second type and template information extracted based on an information extraction approach corresponding to the second type, and combining the obtained first regular expression and second regular expression to obtain a regular expression corresponding to the template.

20. The non-transitory storage medium according to claim 19, wherein the format parsing includes JSON format parsing, and the generating the regular expression corresponding to the parameter whose parameter type is the second type based on the template information and the regular expression generation approach corresponding to the second type includes:

obtaining a character-type value and a number-type value from the template information by using a double-pointer access approach; and generating the regular expression based on the obtained character-type value and number-type value and the regular expression generation approach corresponding to the second type.

\* \* \* \* \*

UNITED STATES PATENT AND TRADEMARK OFFICE
CERTIFICATE OF CORRECTION

PATENT NO. : 12,299,436 B2
APPLICATION NO. : 18/318632
DATED : May 13, 2025
INVENTOR(S) : Bingxu Chai et al.

Page 1 of 1

It is certified that error appears in the above-identified patent and that said Letters Patent is hereby corrected as shown below:

In the Claims

Column 25, Claim 1, Line 7:
"parameter type; and" should read: --parameter type;--.

Column 29, Claim 15, Line 63:
"parsing whether" should read: --parsing, whether--.

Signed and Sealed this
Twelfth Day of August, 2025

Coke Morgan Stewart
*Acting Director of the United States Patent and Trademark Office*